United States Patent
Elliot

(10) Patent No.: US 8,122,226 B2
(45) Date of Patent: Feb. 21, 2012

(54) METHOD AND APPARATUS FOR DYNAMIC PARTIAL RECONFIGURATION ON AN ARRAY OF PROCESSORS

(75) Inventor: Gibson D. Elliot, Oak Run, CA (US)

(73) Assignee: VNS Portfolio LLC, Cupertino, CA (US)

( * ) Notice: Subject to any disclaimer, the term of this patent is extended or adjusted under 35 U.S.C. 154(b) by 328 days.

(21) Appl. No.: 12/425,336

(22) Filed: Apr. 16, 2009

(65) Prior Publication Data

US 2010/0268911 A1 Oct. 21, 2010

(51) Int. Cl.
  G06F 9/30 (2006.01)
  G06F 9/40 (2006.01)
  G06F 15/00 (2006.01)
(52) U.S. Cl. ............................................ 712/13; 712/15
(58) Field of Classification Search .................. None
  See application file for complete search history.

(56) References Cited

U.S. PATENT DOCUMENTS

| 6,092,174 A * | 7/2000 | Roussakov | 712/15 |
| 2008/0059764 A1 * | 3/2008 | Stefan | 712/28 |

* cited by examiner

*Primary Examiner* — Corey S Faherty
(74) *Attorney, Agent, or Firm* — Edward P. Heller III

(57) ABSTRACT

A method and apparatus for dynamic partial reconfiguration on an array of processors. The method includes the steps of verifying if a processor is ready for dynamic partial reconfiguration to begin, deciding the degree of dynamic partial reconfiguration, including the number and identity of all processors to be modified, executing native machine code in the port of a processing device, and modifying a segment of the internal memory of said single processing device. Additional embodiments allow modification of multiple processors in the array, including the modification of all processors on a die or system. The apparatus includes a processor array having a first group of processors connected together for performing a first task, and a second group of processors connected together for performing a second task with at least one processor connected to said first group of processors and said second group of processors for facilitating communications between said first group of processors and said second group of processors without participating in said first task and said second task. In an embodiment of the apparatus, this one processor dynamically reconfigures the array. Additional embodiments allow additional processors to aid in the reconfiguration.

4 Claims, 15 Drawing Sheets

METHOD AND APPARATUS FOR DYNAMIC PARTIAL RECONFIGURATION ON AN ARRAY OF PROCESSORS

COPYRIGHT NOTICE AND PERMISSION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention pertains to an array of processors utilized to perform processing intensive functions. In particular, the invention pertains to methods and apparatus of implementing dynamic partial reconfiguration of a process or processes on an array of processors.

BACKGROUND OF THE INVENTION

Processing devices can be utilized for a wide range of applications. For example, an electronic hearing aid includes a first processing device for converting electrical signals from a microphone into digital samples. A second processing device processes the digital samples to amplify or attenuate the particular frequencies where a user suffers hearing loss. A third processing device converts the processed digital samples into electrical signals used at a speaker for producing sound. In prior art systems, each of these processing devices is preprogrammed for their prescribed function. If the required function of the processing devices is to be modified from its original function, the processing devices must be sent back to the manufacturer for an adjustment.

SUMMARY OF THE INVENTION

One embodiment of the proposed invention uses computers on an asynchronous array of processors for the purpose of synchronizing an array hearing aid system containing synchronous sub-systems.

In another embodiment of the system of the invention, as an electronic hearing aid, the functions of the hearing aid are carried out on an array of processing devices. An array of processing devices allows for the functions associated with the hearing aid system to be subdivided over the array of processing devices. Larger tasks are divided into smaller tasks that are spread across the array of processing devices for faster performance and smaller power consumption.

Each processing device, as part of an array of processing devices, is homogenous and can be programmed to perform any number of different functions. Thus, reconfiguration of a task spread across an array of processing device is made easier because the smaller tasks performed on a single or multiple processing devices can be reconfigured because of the many different functions that can be performed on a particular processing device. A key to the reconfiguration of a processing device is that this process does not disrupt the original function of the system. For example in the hearing aid system, if a parameter like the gain for a particular frequency band is updated by the user, there should not be any periods of inaudible sound. Also, the reconfiguration is not restricted for use with a single multiple processing device or multiple processing devices, but instead is flexible enough to reconfigure the entire function of the array of processing devices while remaining within the context of the larger system in which the array of processing devices are utilized. For example, in the hearing aid system, the array of processing devices can be reconfigured as long as the system remains in the context of a microphone, signal processor, and speaker system. Last, the reconfiguration of a processing device or devices in the field does not pose limitations of significant power consumption, size requirements, and also speed requirements.

DETAILED DESCRIPTION OF THE INVENTION

Figure 1:
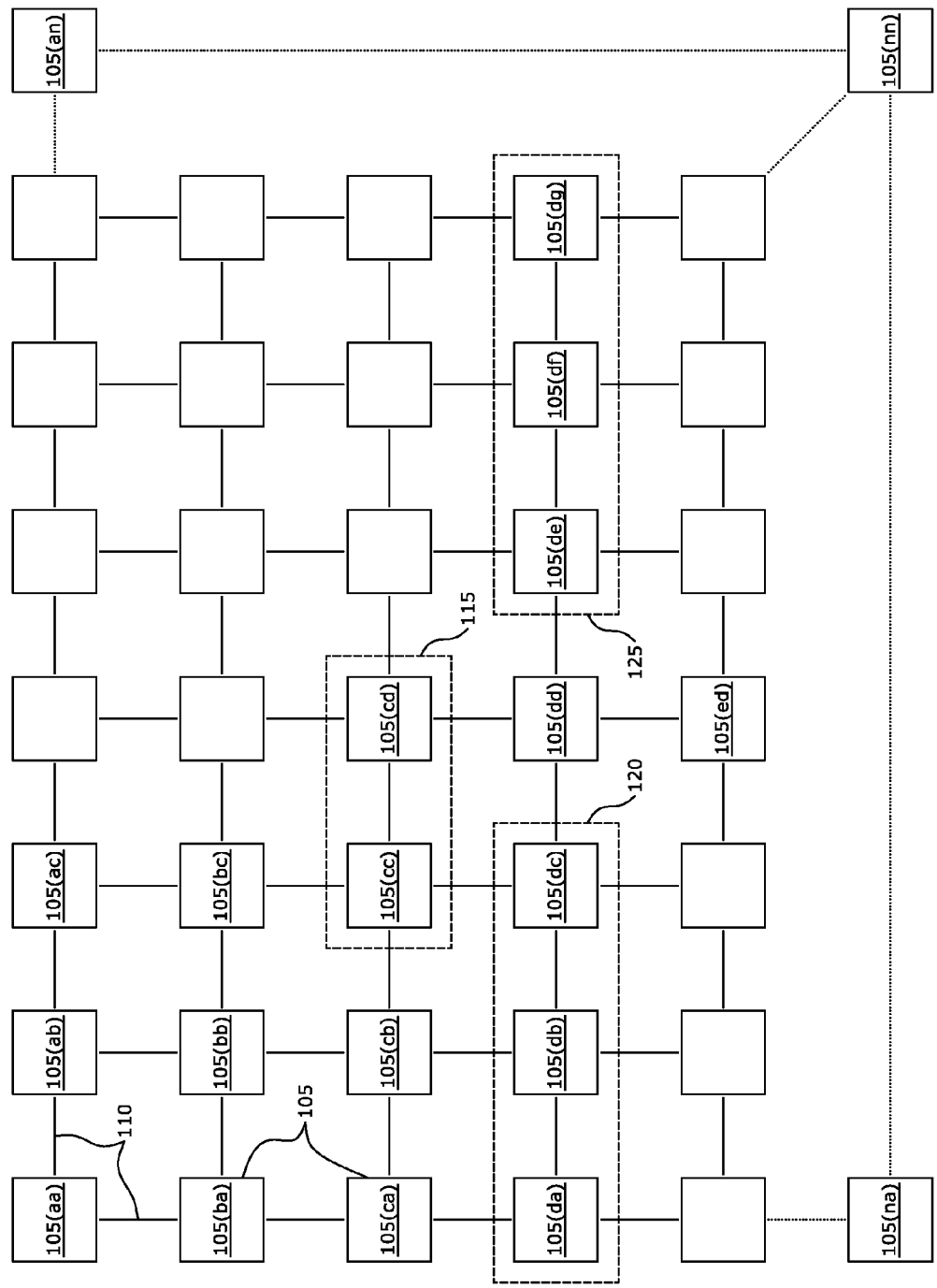
FIG. 1 is a block diagram of a first embodiment of the apparatus of the invention.

FIG. 1 illustrates an array of processors performing multiple functions. A processing device 105 communicates with neighboring processing devices over a single drop bus 110 that includes data lines, read lines, read control lines, and write control lines. There is no common bus. For example, processing device 105($bb$) communicates with four neighboring processors 105($ba$), 105($ab$), 105($bc$), and 105($cb$) using buses 110. In an alternate embodiment, a diagonal intercommunication bus (not shown) could be used to communicate diagonally between neighboring processors instead of or in addition to the present orthogonal buses 110. For example, processing device 105($bb$) would communicate with neighboring processors 105($aa$), 105($ac$), 105($ca$), and 105($cc$).

A first operation 115 is spread across processing devices 105($cc$) and 105($cd$). A second operation 120 is spread across processing devices 105($da$), 105($db$), and 105($dc$). A third operation 125 is spread across processing devices 105($de$), 105($df$), and 105($dg$). A processing device 105($dd$) is operational as a blind node (herein referred to as blind node 105 ($dd$)) positioned between second operation 120 and third operation 125 on an array of processors. The arrangement of three operations and blind node on an array of processors 105 illustrates only one of many ways in which operations and blind nodes can be arranged. In an alternate embodiment, more than one blind node can be present. Furthermore, the operations can take up fewer or greater than the number of processing devices shown in FIG. 1.

The function of the blind node 105(dd) is to echo control requests between operations spread across an array of processing devices to maintain the real-time behaviors across such segments in a sub-process contained within a logical process timeslot. Shown in FIG. 1 is third operation 125, which requires an input from a second operation 120. The blind node separating the operations echoes either the read request from operation 125 to operation 120 or echoes the write request from operation 120 to operation 125, depending upon weather the process is "Demand driven", "Source driven" or "Demand-Source Synchronized", as in this embodiment.

The array of processors 105 perform multiple operations in which two of the operations are connected by blind node 105(dd) and a third operation is dynamically partially reconfigured by means of the blind node. The purpose of the blind node 105(dd) is not specifically one of enabling reconfiguration. It is instead a mechanism for controlling real-time behavior of an asynchronous array by way of mirroring input control signals of a given node on it's output ports, thus making the process "Blind" to it's existence. In this context, a blind node 105(dd) may be fitted with an additional component to allow dynamic reprogramming. In fact, any node with ample code space and bandwidth can facilitate reprogramming.

Figure 2A:
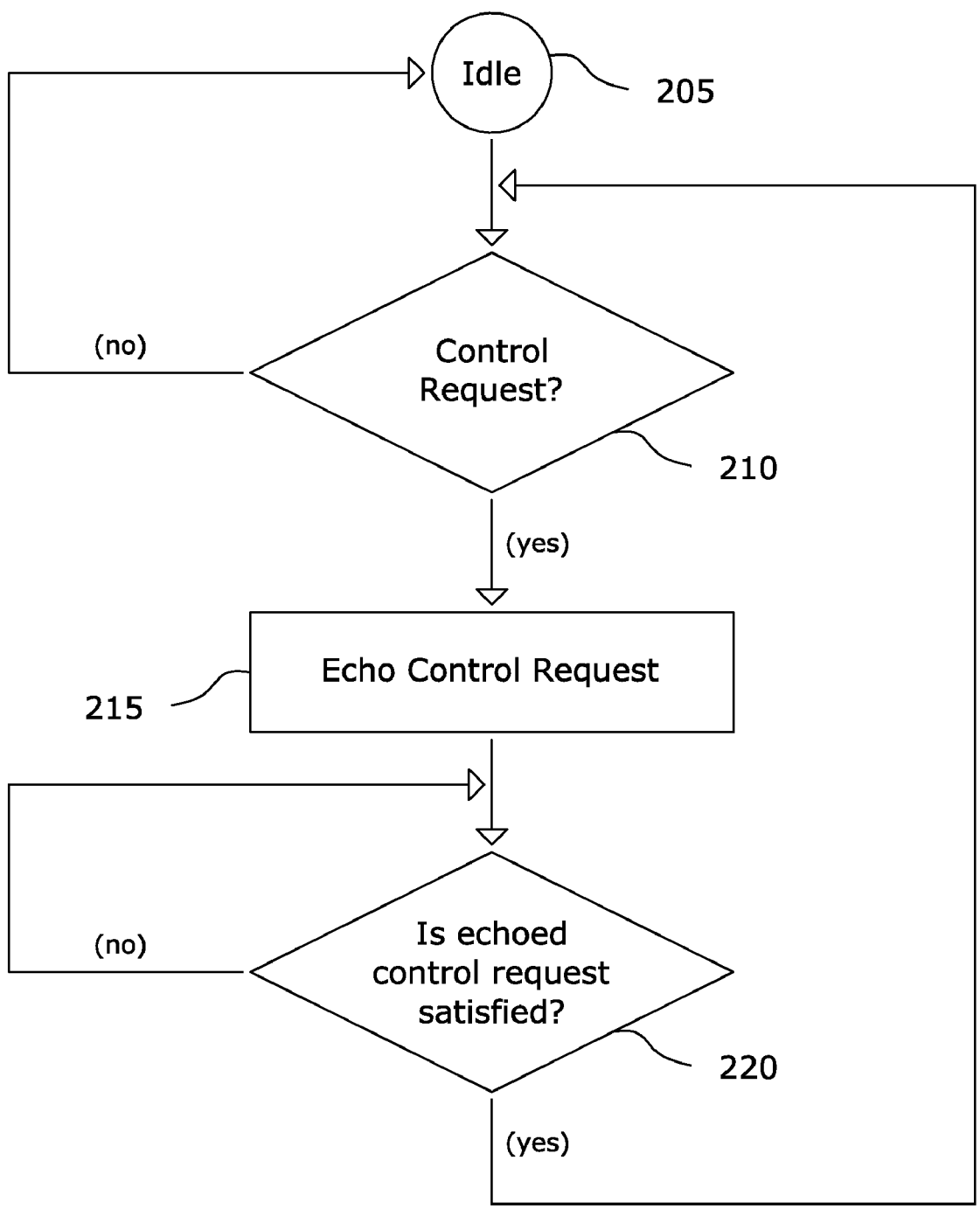
FIG. 2a is a flowchart of a first embodiment of the method of the invention.

FIG. 2a is a state machine that controls the function of the blind node according to one embodiment. In the power up condition the state machine is in an idle state 205. In a step 210, the state machine verifies if a control request has been made to the blind node. If the control request has been made in a step 210, then in a step 215 the control request is echoed. For example, referring back to FIG. 1, if third operation 125 makes a control request to blind node 105(dd) by means of processing device 105(de), the control request is echoed to processing device 105(dc) as part of second operation 120. Otherwise, the state machine returns to idle state 205. In a step 220 the state machine checks for the echoed control request to be satisfied. Until the echoed control request is satisfied, blind node 105(dd) enters a low power state.

Figure 2B:
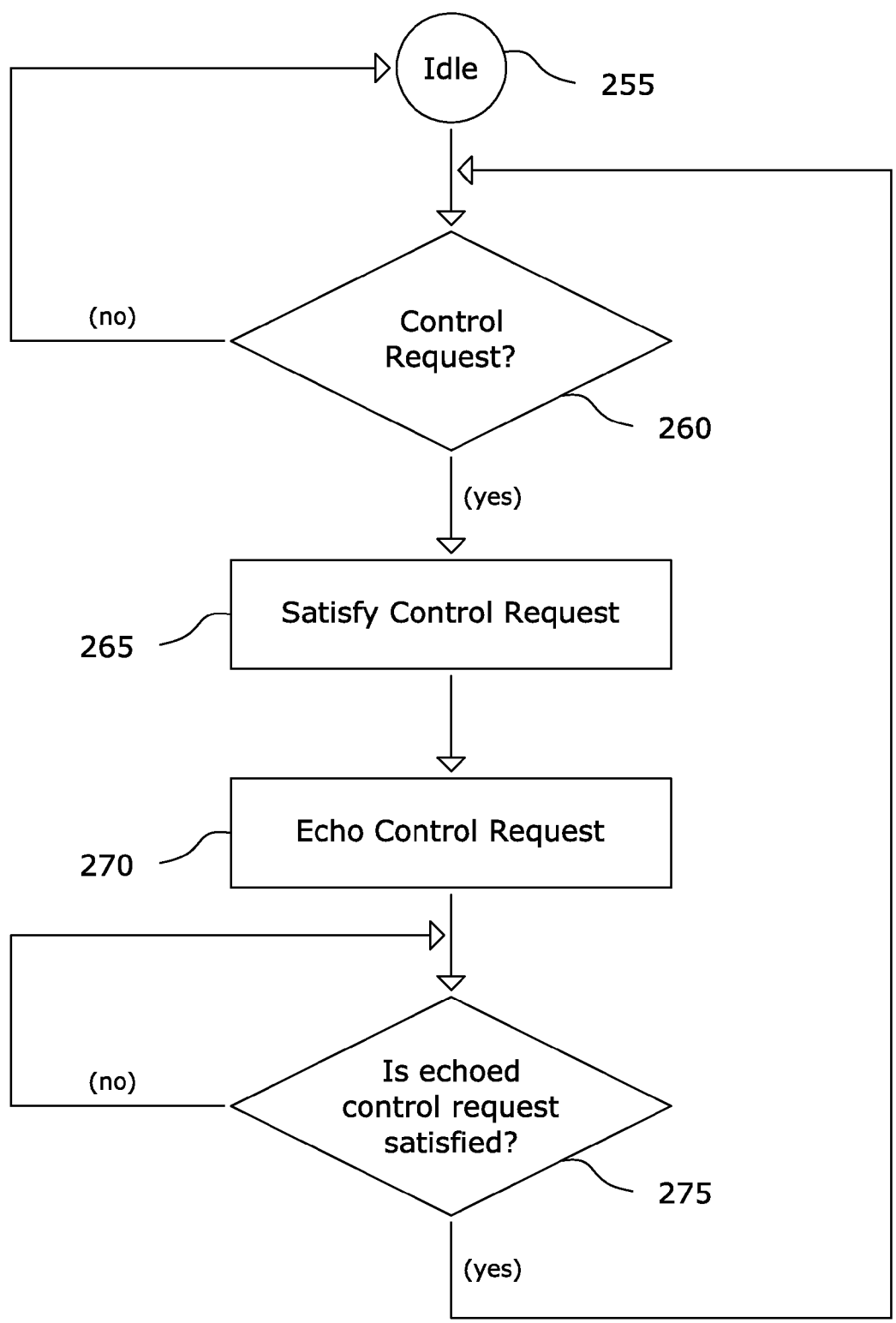
FIG. 2b is a flowchart of a second embodiment of the method of the invention.

FIG. 2b is a state machine that controls the function of the blind node according to one embodiment. In the power up condition, the state machine is in an idle state 255. In a step 260, the state machine verifies if a control request has been made to the blind node. If the control request has been made in a step 260, then in a step 265 the control request is satisfied. For example, referring back to FIG. 1, if third operation 125 makes a control request to blind node 105(dd) by means of processing device 105(de), the control request is satisfied by the blind node 105(dd) completing a corresponding control request to processing device 105(de). Otherwise, the state machine returns to idle state 255. In a step 270, the control request is echoed. For example, referring back to FIG. 1, if third operation 125 makes a control request to blind node 105(dd) by means of processing device 105(de), the control request is echoed to processing device 105(dc) as part of second operation 120. In a step 275, the state machine checks for the echoed control request to be satisfied. Until the echoed control request is satisfied, blind node 105(dd) enters a low power state.

Figure 3A:
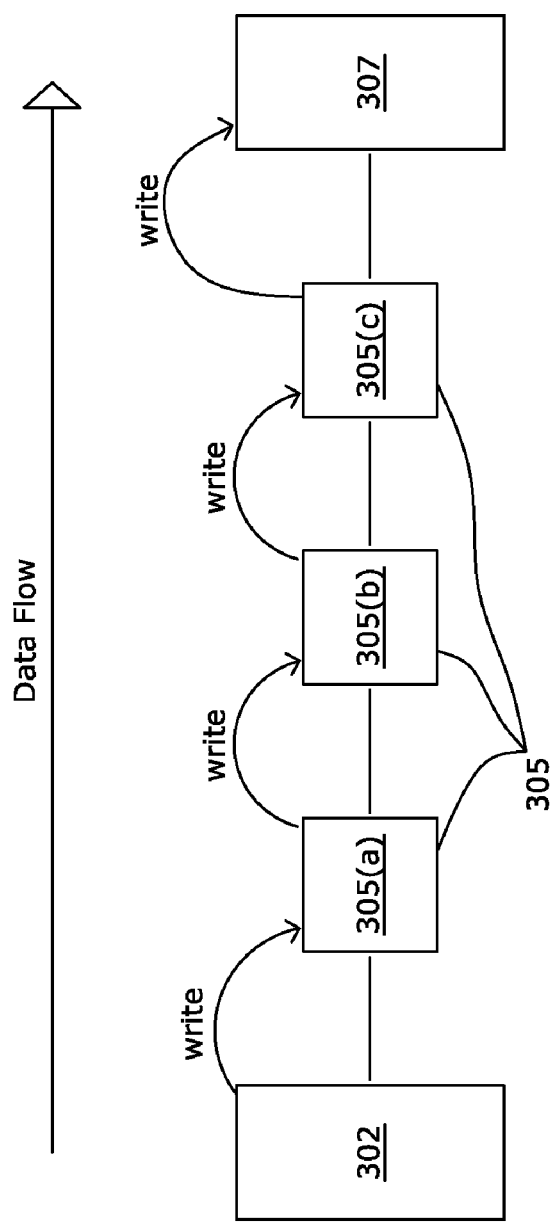
FIG. 3a is a block diagram of a second embodiment of the apparatus of the invention.

FIG. 3a is a block diagram of a second embodiment of the apparatus of the invention. This embodiment includes three asynchronous processing devices connected to an input device and output device. This is a supply side system that includes three asynchronous processing devices connected to an input device and output device. "Supply Side," and "Demand Side" issues do not necessarily have anything to do with reprogramming. The data flow path for the system is from left to right and is supply side driven. A synchronous input device 302 (herein referred to as device 302) provides an input to a processing device 305(a). The processing device 305(a) performs a task whose result is utilized by a processing device 305(b). The processing device 305(b) performs a task whose result is utilized by a processing device 305(c). The processing device 605(c) performs a task whose result is passed to a synchronous output device 607 (herein referred to as device 607). According to one embodiment, the supply side driven system begins with device 302 providing an input to processing device 305(a) by making a write request to processing device 305(a). Processing device 305(a) maintains a low power state until the input from device 302 is ready. Upon receiving the input from device 302, processing device 305(a) will complete its task and follow that with a write request to the neighbor processing device 305(b). Until processing device 305(b) completes a corresponding read request to the neighbor processing device 305(a), processing device 305(a) maintains a low power state. Recall that processing device 305(b) requires an input from the processing device 305(a) prior to performing its task. Hence, processing device 305(b) will maintain a low power non-operational state until it receives the input from processing device 305(a). Once processing device 305(b) receives the input from processing device 305(a), processing device 305(b) will perform its own task and upon completion will make a write request to the neighbor processing device 305(c). Until processing device 305(c) completes a corresponding read request to the neighbor processing device 305(b), processing device 305(b) maintains a low power non-operational state. Recall that processing device 305(c) requires an input from the processing device 305(b) prior to performing its task. Hence, processing device 305(c) will maintain a low power state until it receives the input from processing device 305(b). Once processing device 305(c) receives the input from processing device 305(b), processing device 305(c) will perform its own task and upon completion make a write to device 307.

In an alternate embodiment, processing devices 305(a) and 305(c) are operable as blind nodes and additionally perform a function in the case of processing device 305(a), whose input comes from device 302 and whose output is required for processing device 305(b), and in the case of processing device 305(c), whose input comes from processing device 305(b) and whose output is required for device 307. Hence, processing devices 305(a) and 305(c) are controlled by the state machines of FIGS. 2a and 2b.

Figure 3B:
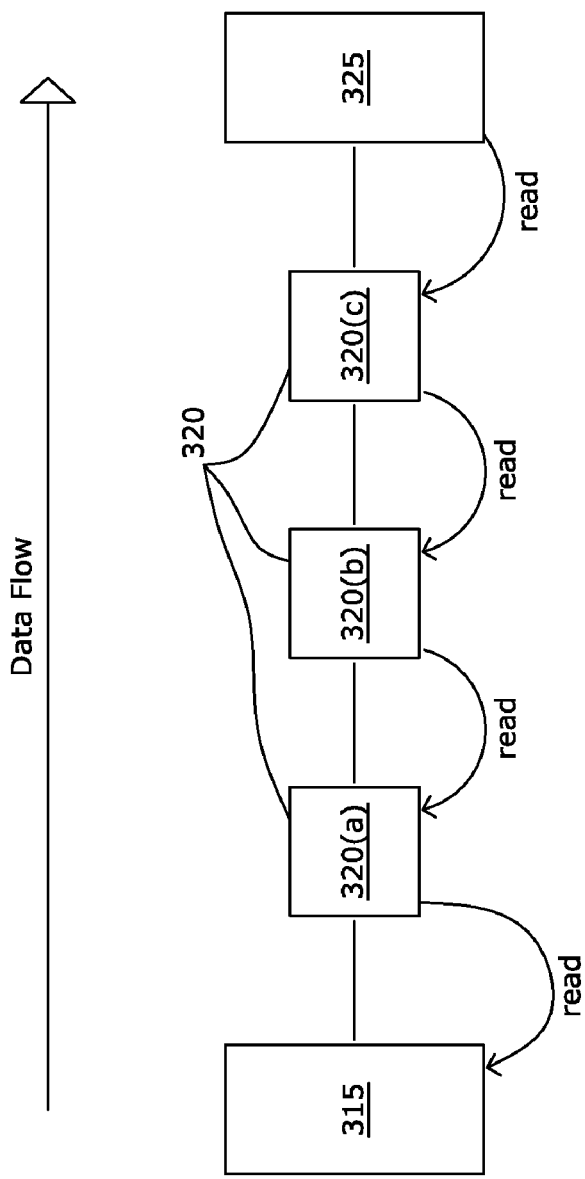
FIG. 3b is a block diagram of a third embodiment of the apparatus of the invention.

FIG. 3b is a block diagram of a third embodiment of the apparatus of the invention. This embodiment is a demand side system that includes three asynchronous processing devices connected to a synchronous input device and synchronous output device with a blind node operational, according to one embodiment. The data flow path for the system is from left to right and is demand side driven. A synchronous input device 315 (herein referred to as device 315) provides an input to a processing device 320(a). The processing device 320(a) performs a task whose result is utilized by a processing device 320(b). Processing device 320(b) performs a task whose result is utilized by a processing device 320(c). Processing device 320(c) performs a task whose result is sent to a synchronous output device 325 (herein referred to as device 325).

According to one embodiment, the demand side driven system begins with device 325 requesting an input from processing device 320(c) by making a read request to processing device 320(c). Processing device 320(c) performs a task that requires an input from processing device 320(b). Hence, processing device 320(c) will make its own read request to processing device 320(b), and processing device 320(c) maintains a low power non-operational state until it receives the input from processing device 320(b). Processing device 320(b) performs a task that requires an input from processing device 320(a). Hence, processing device 320(b) will make its own read request to processing device 320(a), and processing device 320(b) maintains a low power state until it receives the input from processing device 320(a). Processing device 320(a) performs a task that requires input from device 315. Hence, processing device 320(a) will make its own read request to device 315, and processing device 320(a) maintains a low power non-operational state until it receives the input from device 315. Recall that both devices 315 and 325 are synchronous. Furthermore, these devices are clocked on the same signal. Thus, when a read request is made by device 325, the read request is echoed until processing device 315 completes the corresponding write to processing device 320(a). Processing device 320(a) completes its task and sends the output to processing device 320(b), completing the corresponding write to processing device 320(b). Processing device 320(b) completes its task and sends the output to processing device 320(c), completing the corresponding write to processing device 320(c). Processing device 320(c) completes its task and sends the output to device 325, completing the corresponding write to processing device 325.

Figure 3C:
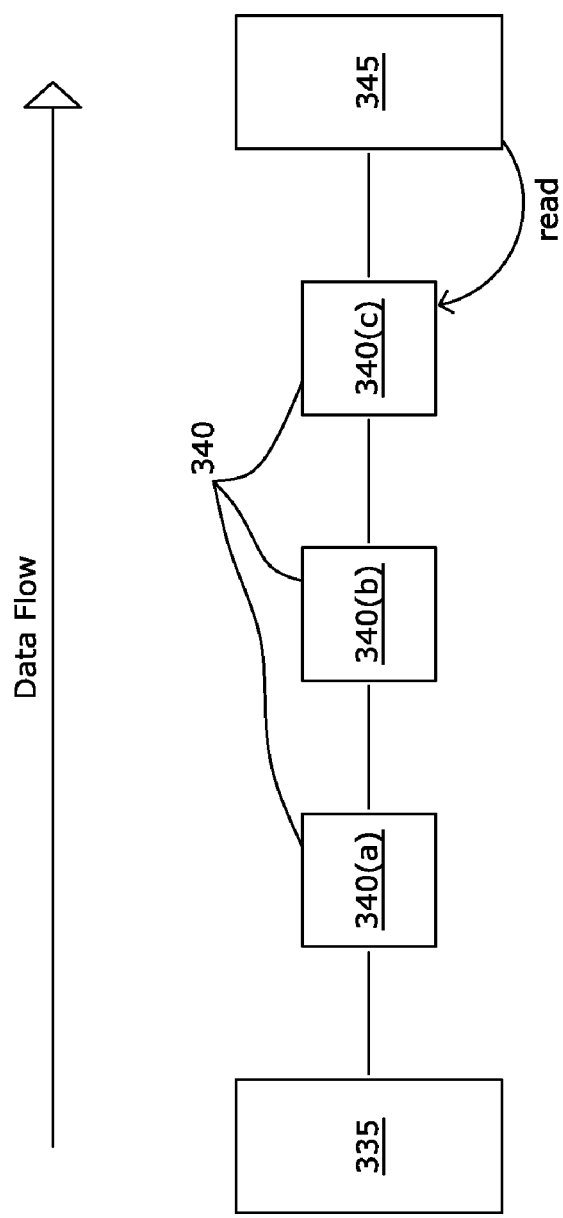
FIG. 3c is a block diagram of a fourth embodiment of the apparatus of the invention.

FIG. 3c is a block diagram of a forth embodiment of the apparatus of the invention. This embodiment is a demand side system that includes three asynchronous processing devices connected to a synchronous input device and synchronous output device with a blind node operational according to a second embodiment. The data flow path for the system is from left to right and is demand side driven. A synchronous input device 335 (herein referred to as device 335) provides an input to a processing device 340(a). The processing device 340(a) performs a task whose result is utilized by a processing device 340(b). Processing device 340(b) performs a task whose result is utilized by a processing device 340(c). Processing device 340(c) performs a task whose result is sent to a synchronous output device 345 (herein referred to as device 345).

According to this embodiment, the demand side driven system begins with device 345 requesting an input from processing device 340(c) by making a read request to processing device 340(c). Processing device 340(c), having already computed the value which satisfies the read request of device 345, echoes its own read request to processing device 340(b), and processing device 340(c) maintains a low power state. Processing device 340(b), having already computed the value which satisfies the read request of processing device 340(c), echoes its own read request to processing device 340(a), and processing device 340(b) maintains a low power state. Processing device 340(a), having already computed the value which satisfies the read request of processing device 340(b), echoes its own read request to device 335, and processing device 340(a) maintains a low power state. Device 335 and device 345 are clocked on the same signal. Thus, when a read request is made by device 345, the read request is echoed until device 335 completes the corresponding write request to processing device 340(a). Processing device 340(a) will immediately satisfy the corresponding write request to processing device 340(b), and follow that with the computation of the next output to send to processing device 340(b) to satisfy the next corresponding write request to processing device 340(b). Processing device 340(b) will immediately satisfy the corresponding write request to processing device 340(c), and follow that with the computation of the next output to send to processing device 340(c) to satisfy the next corresponding write request to processing device 340(c). Processing device 340(c) will immediately satisfy the corresponding write request to device 345, and follow that with the computation of the next output to send to device 345 to satisfy the next corresponding write request to processing device 345. In this embodiment, each of the processing devices 340(a), 340(b), and 340(c) are processing devices operational as blind nodes.

In an alternate embodiment, each of the processing devices 340(a), 340(b), and 340(c) of FIG. 3c are used as blind nodes; however, the order of their function is changed. Device 345 makes a read request to processing device 340(c). Processing device 340(c), having already computed the value which satisfies the read request of device 345, immediately sends the value to processing device 345 and follows this with a read request to processing device 340(b), and processing device 340(c) maintains a low power non-operational state. Processing device 340(b), having already computed the value which satisfies the read request of processing device 340(c), immediately sends the value to processing device 340(c) and follows this with a read request to processing device 340(b), and processing device 340(b) maintains a low power non-operational state. Processing device 340(a), having already computed the value which satisfies the read request of processing device 340(b), immediately sends the value to processing device 340(b), and follows this with a read request to device 335, and processing device 340(a) maintains a low power non-operational state. Device 335 and device 345 are clocked on the same signal. Thus, when a read request is made by device 345, the read request is echoed until device 335 completes the corresponding write request to processing device 340(a). Processing device 340(a) will immediately satisfy the corresponding write request to processing device 340(b), and follow that with the computation of the next output to send to processing device 340(b) to satisfy the next corresponding write request to processing device 340(b). Processing device 340(b) will immediately satisfy the corresponding write request to processing device 340(c), and follow that with the computation of the next output to send to processing device 340(c) to satisfy the next corresponding write request to processing device 340(c). Processing device 340(c) will immediately satisfy the corresponding write request to device 345, and follow that with the computation of the next output to send to device 345 to satisfy the next corresponding write request to processing device 345.

Referring back to FIG. 1 and the blind node 105(dd) positioned between the second operation 120 and the third operation 125, there is a certain amount of time between the echoed control request being satisfied and the next control request made to the blind node 105(dd). It is in this period of time that the processing device acting as a blind node 105(dd) can take on secondary functions. The secondary functions are only limited to those which can be completed in the given period of time. There are two common secondary functions, the first is a function as part of either the second operation 120 or third operation 125, and the second is a function of dynamic partial reconfiguration ("DPR").

In an alternate embodiment, the blind node 105(dd) can, upon power up of the processing device, enter a low power state awaiting a control request from a neighboring processing device. If the blind node 105(dd) has not received a control request after a certain amount of time, the blind node can begin its secondary function.

Figure 4:
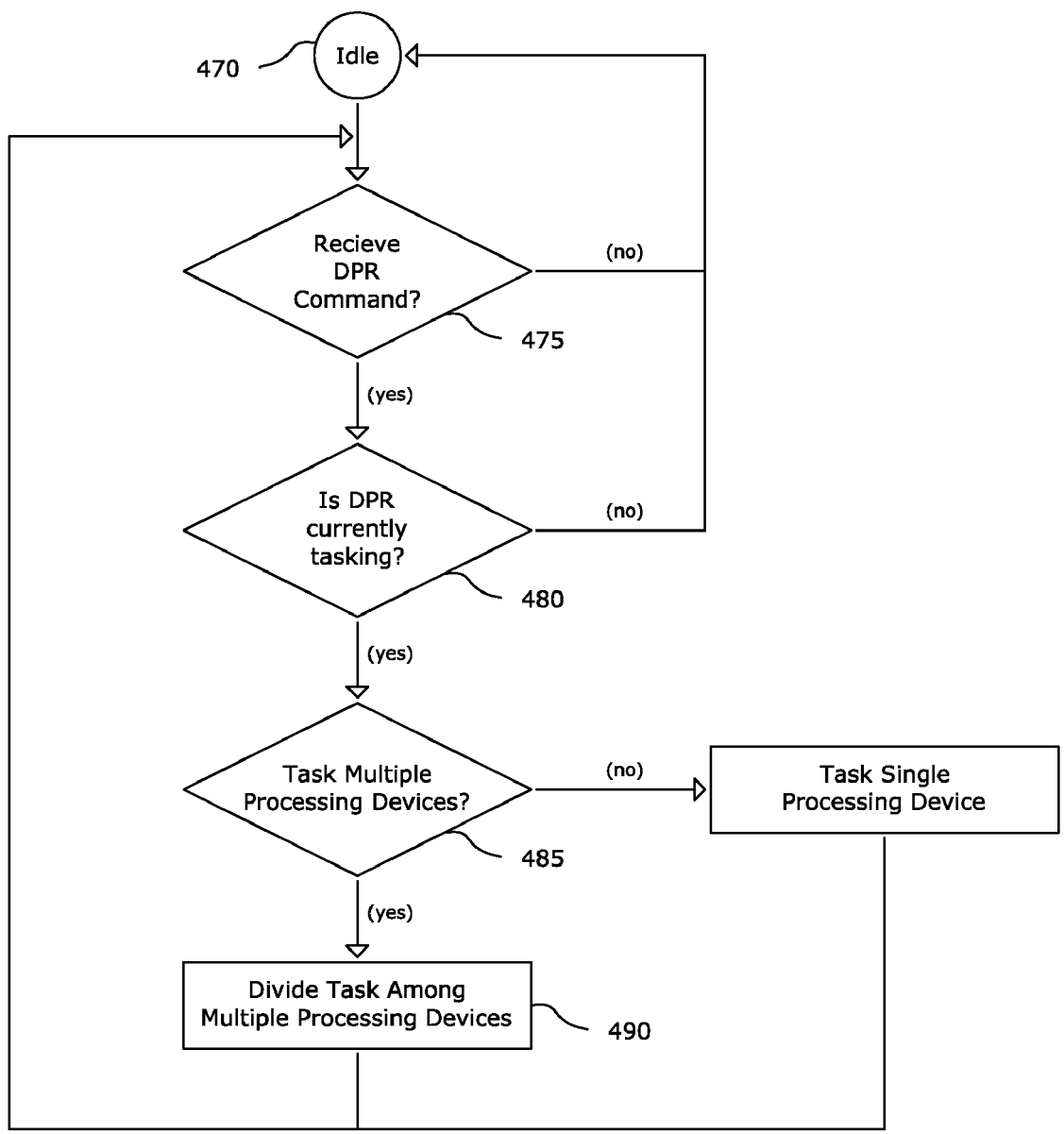
FIG. 4 is a flowchart of a third embodiment of the method of the invention.

FIG. 4 is a flowchart of a third embodiment of the method of the invention. The FIG. 4 embodiment is a state machine that controls the function of the blind node when it is used for a secondary function of DPR, according to one embodiment. In the power up condition, the state machine is in an idle state 470. In a step 475, the state machine verifies if the blind node has received a command for DPR. If the command for DPR has been received, then in a step 480 the state machine verifies if DPR is currently tasking the processing devices. Otherwise, the state machine returns to idle state 470. In a step 485, the state machine verifies if multiple processing devices are being tasked based on the DPR command. If in a step 485, multiple processing devices are being tasked based on the DPR command, then in a step 490 the task is subdivided among the multiple processing devices. Otherwise, the task is assigned to a single processing device in a step 495.

Figure 4A:
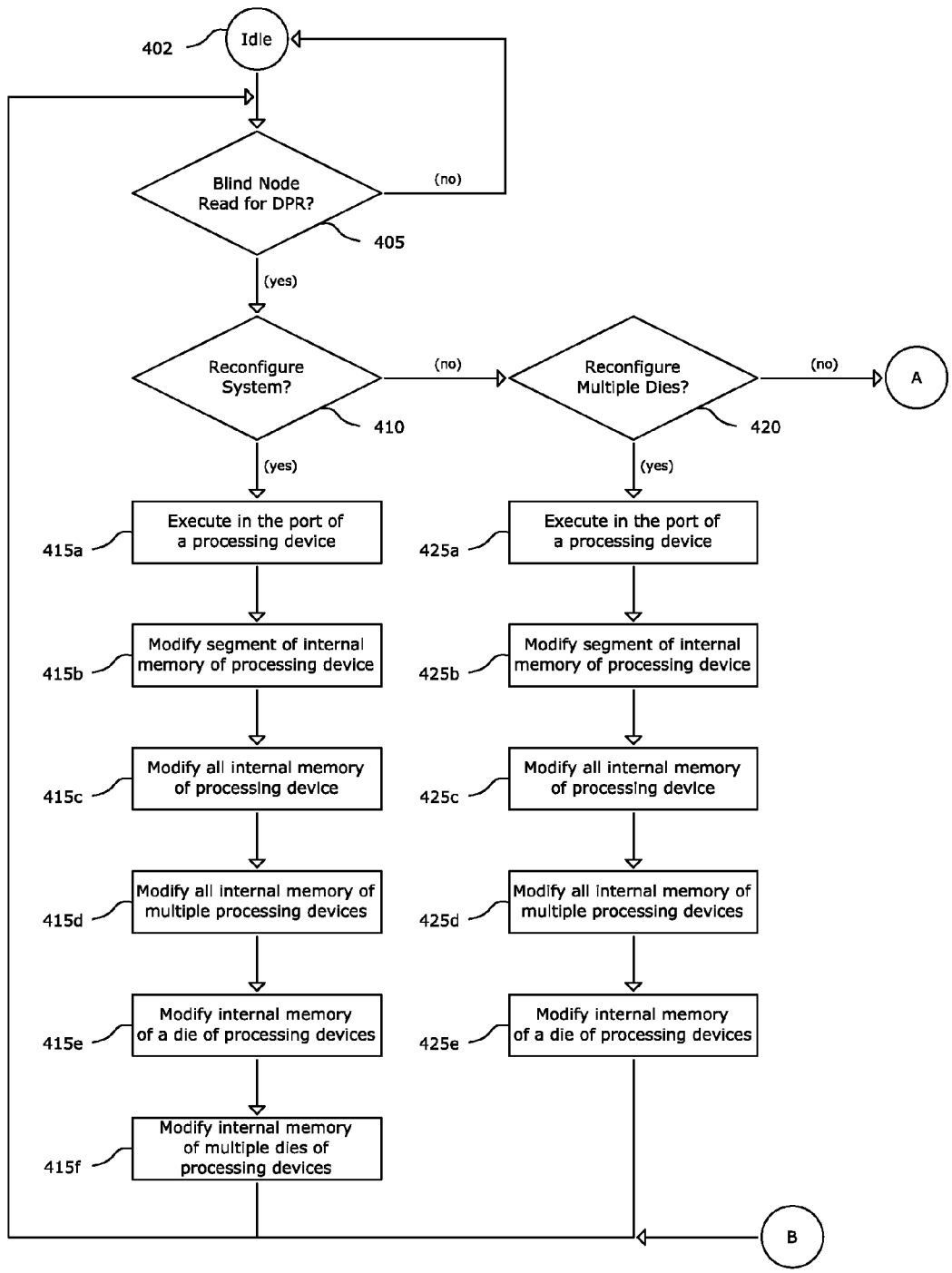
FIGS. 4a and 4b are flowcharts of a fourth embodiment of the method of the invention.
Figure 4B:
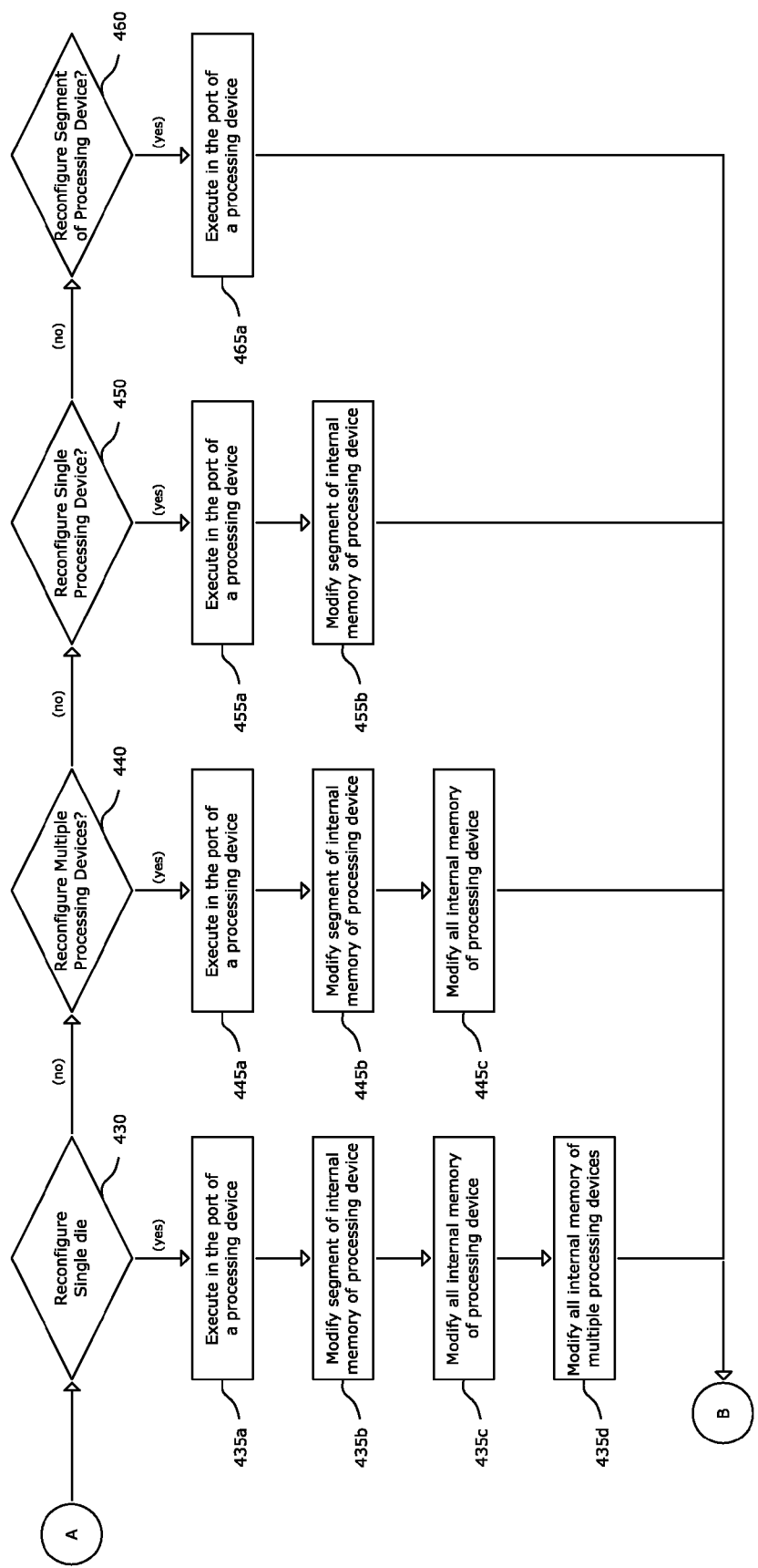

FIGS. 4a and 4b are flowcharts of a fourth embodiment of the method of the invention, illustrating a state machine to control dynamic partial reconfiguration on an array of processing devices. Port execution is not necessarily the first step in a reconfiguration; in fact the process by which code is initially installed into a booting device is also similarly done.

The FIG. 4a and FIG. 4b embodiment is a state machine that controls the function of the blind node when it is used for a secondary function of DPR, according to one embodiment. In the power up condition, the state machine is in an idle state 402. In a step 405, the state machine verifies if the blind node is ready for DPR to begin. If DPR is ready to begin, in step 405 the state machine moves to a series of decision blocks that determine the degree of DPR ranging from an entire system on an array of processing devices to executing code in the port of a single processing device. If in a step 410 the DPR is meant for an entire system on an array of processing devices, then in a step 415a DPR begins with executing native machine code (herein referred to as code) in the port of a processing device. Next, in a step 415b, a segment of the internal memory of a single processing device is modified. Next, in a step 415c, the complete internal memory of a single processing device is modified. Next, in a step 415d, the internal memory of multiple processing devices is modified. Next, in a step 415e, the internal memories of all processing devices on a single die of processing devices are modified. Last, in a step 415f, the internal memories of all processing devices on all dies of processing devices are modified. The invention is not limited to placing all devices on a single die or any particular number of dies. The use of the term die is illustrative only.

If in a step 420 the DPR is meant for the reconfiguration of a single die of processing devices, then in a step 425a DPR begins with executing native code in the port of a processing device. Next, in a step 425b, a segment of the internal memory of a single processing device is modified. Next, in a step 425c, the complete internal memory of a single processing device is modified. Next, in a step 425d, the internal memory of multiple processing devices is modified. Last, in a step 425e, the internal memory of all processing devices on a single die of processing devices are modified.

If in a step 430 the DPR is meant for the reconfiguration of multiple processing devices on a single die, then in a step 435a DPR begins with executing native code in the port of a processing device. Next, in a step 435b, a segment of the internal memory of a single processing device is modified. Next, in a step 435c, the complete internal memory of a single processing device is modified. Last, in a step 435d, the internal memory of multiple processing devices is modified.

If in a step 440 the DPR is meant for the reconfiguration of a single processing device, then in a step 445a DPR begins with executing native code in the port of a processing device. Next, in a step 445b, a segment of the internal memory of a single processing device is modified. Last, in a step 445c, the complete internal memory of a single processing device is modified.

If in a step 450 the DPR is meant for the reconfiguration of a segment of the internal memory of a single processing device, then in a step 455a DPR begins with executing native code in the port of a processing device. Next, in a step 455b, a segment of the internal memory of a single processing device is modified.

If in a step 460 the DPR is meant for the reconfiguration of the immediate execution of a single processing device, then in a step 465a DPR begins and ends with executing native code in the port of a processing device.

In an alternate embodiment, the state machine controlling DPR is not limited to DPR of a system, die of processing devices, multiple processing devices on a single die, single processing device, segment of internal memory of a processing device, or the execution of a single processing device. Instead, combinations of the listed DPR methods are also possible. For example, DPR of a single die of processing devices plus only one half of the processing devices on a second die of processing devices are possible. A second example of DPR includes a single processing device plus a segment of internal memory of a second processing device. However, if the DPR is a combination of the DPR methods listed in the state machine of FIG. 4, then each part of the DPR is completed in the manner described by the state machine of FIG. 4.

Referring back to FIG. 1, processing device 105(dd) is operational as a blind node between second operation 120 and third operation 125. Thus, processing device 105(dd) has a period of time between the completion of the corresponding control request and the next received control request. During this time processing device 105(dd) can be used for DPR of processing devices 105(cc) and 105(cd), which are part of first operation 115.

According to one embodiment, the secondary function of processing device 105(dd) operational as a blind node (herein referred to as blind node 105(dd)) is to check both the north and south ports for a write to the blind node 105(dd). Processing device 105(ed) makes a write request to the blind node 105(dd), and the processing device 105(dd) jumps to its south port to fetch the incoming native machine code and immediately pass this to its north port. Processing device 105(cd), periodically checking its South port, jumps to its South port and begins executing the incoming native machine code as soon as it sees that blind node 105(dd) is writing to its North port. It is ideal for processing device 105(dd) to have sufficient time to pass to processing device 105(cd) enough native machine code to reconfigure both processing device 105(cd) and 105(cc). Thus, it is ideal for processing device 105(cc) to periodically check its East port and jump to that East port as soon as it sees processing device 105(cd) writing to its West port. Hence, processing device 105(cc) is reconfigured by first executing native machine code from its East port. Recall that to reconfigure multiple processing devices, a processing device must first execute native machine code from its port, followed by a segment of internal memory being modified, followed by all of the internal memory of the processing device being modified. Hence, processing device 105(cc) executes native machine code from its East port that overlays an existing segment of internal memory in processing device 105(cc). Furthermore, the modified segment of internal memory of processing device 105(cc) can itself rewrite the remainder of the internal memory or fetch the changes to the internal memory from another processing device, for example, processing device 105(*cd*). With processing device 105(*cc*) reconfigured, processing device 105 (*cd*) can complete its own reconfiguration. The reconfiguration of processing device 105(*cd*) begins by executing native machine code from its port to rewrite a segment of the internal memory of processing device 105(*cd*). The new segment of internal memory can be used to reconfigure the internal memory of processing device 105(*cc*) as previously explained. However, after the segment of internal memory of processing device 105(*cd*) assists to reconfigure processing device 105(*cc*), the segment of internal memory returns to reconfigure the internal memory of processing device 105 (*cd*) by either using the new modified segment of internal memory to reconfigure the remainder of the internal memory or to fetch the changes to the internal memory from another processing device, for example, processing device 105(*ed*) by means of blind node 105(*dd*).

In an alternate embodiment, there may not be sufficient time to perform all DPR in the allotted time for DPR of the blind node, for example, when DPR consists of reconfiguring a die of processing devices. However, the blind node functions the same and the processing devices being reconfigured patiently await the completion of the reconfiguration process by being sent native machine code in a manner in which the DPR is broken up into the maximum or smaller number of native machine code which can be sent via the blind node as part of the blind node's secondary function.

Figure 5:
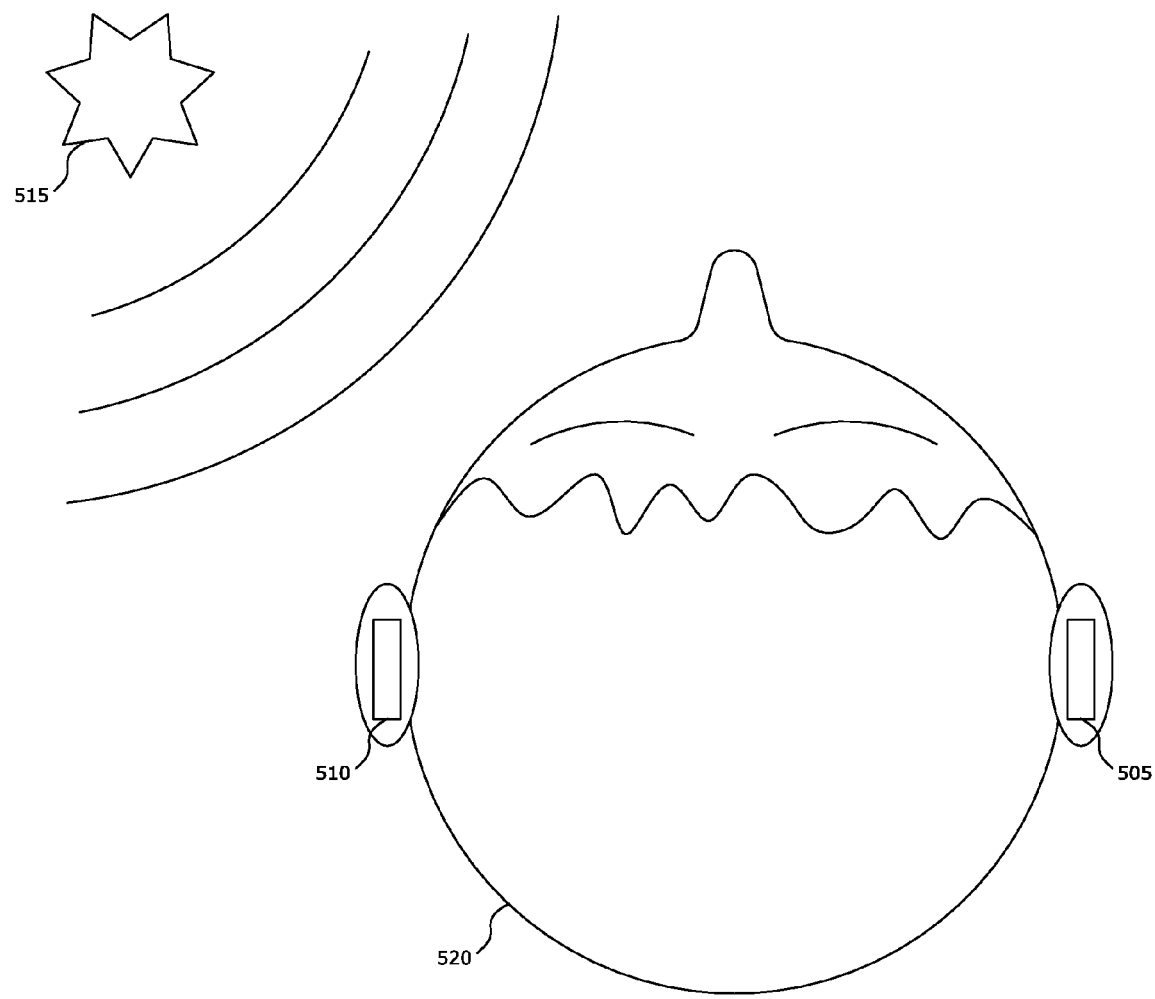
FIG. 5 is a plan view of the physical components of an array hearing aid system incorporating the invention.

FIG. 5 is a plan view of the components of an array hearing aid system. The array hearing aid system, comprising a right earpiece 505, a left earpiece 510, and a user interface device 515, is operable to reproduce processed sound to the cochlea of the inner ear in a manner that amplify or attenuate the particular frequencies where a user 520 suffers hearing loss. The user interface device 515 permits the user 520 options to customize the hearing aid system to the particular needs of the user 520 hearing loss profile or the user 520 listening environment.

Figure 6:
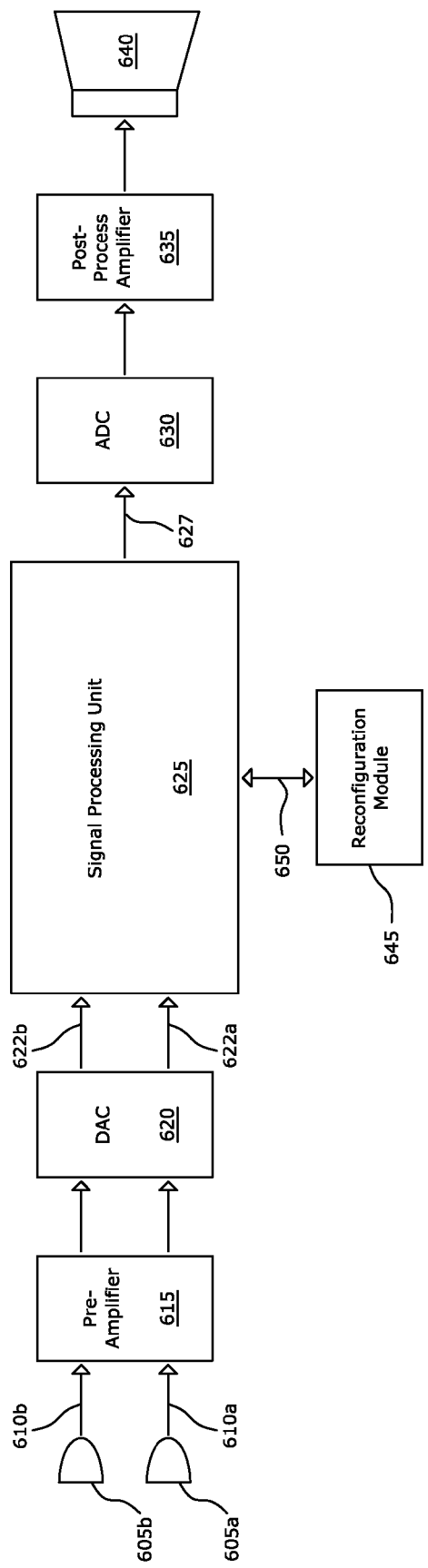
FIG. 6 is a block diagram of an array earpiece in the FIG. 5 embodiment.

FIG. 6 is a functional block diagram of an array earpiece. The functional blocks presently described hereinbelow should be understood to represent signal processing functions performed by the array hearing aid in general, and not its actual circuit layout and arrangement. The array earpiece includes a front microphone 605*a* functionally connected by means of a data and control path (herein referred to in short as path) 610*a* to a pre-amplifier 615. A rear microphone 605*b* is functionally connected to the pre-amplifier 615 by means of a path 610*b*. Each of the microphones 605*a* and 605*b* are transducers operable to produce an electrical signal proportional to a received acoustic signal. The acoustic signal from the front microphone 605*a* and the rear microphone 605*b* is processed separately by the pre-amplifier 615 and next by a digital to analog converter (DAC) 620. A path 622*a* and a path 622*b* represent the digitized acoustic signal for the front microphone 605*a* and the rear microphone 605*b* sent to a signal processing unit 625. A path 627 connects the single output from the signal processing unit 625 and an analog to digital converter (ADC) 630. The digitized acoustics signals from the front microphone 605*a* and rear microphone 605*b* are combined in the signal processing unit 625. The output from the ADC 630 is connected to a post processing amplifier 635 whose output is connected to an earphone 640 operable to reproduce sound for the user 520. The array earpiece further includes a signal processing module 645 operable to modify signal processing unit 625. A path 650 connects the reconfiguration module 645 to signal processing unit 625, and is a means for modifying signal processing unit 625.

Figure 7:
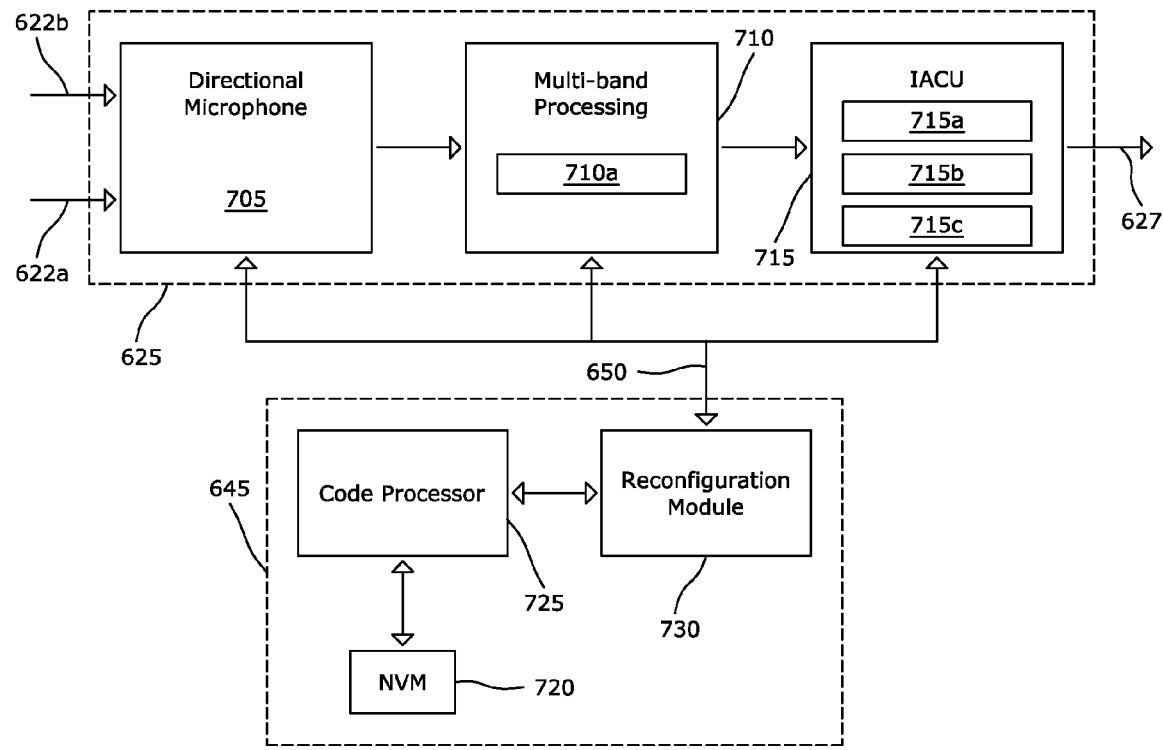
FIG. 7 is a block diagram of the signal processing unit and reconfiguration module according to an embodiment of the invention.

FIG. 7 is a functional block diagram that details the signal processing unit 625 and the reconfiguration module 645 of FIG. 2. The signal processing unit 625 includes a directional microphone 705 operable to combine the front and rear digitized audio samples based on the physical direction from which the intensity of the audio is greatest. The output from the directional microphone 705 is connected to a multiband processing unit 710 that includes a filter bank 710*a* operable to separate the input signal into a plurality of frequency bands. The output from the multiband processing unit 710 is connected to an instant amplitude control unit (IACU) 715 operable to compensate for the hearing defects present in a person suffering from hearing loss, including cochlear hearing loss. The IACU 715 will separately process each frequency band and is accomplished by means of a distinct analytic magnitude divider (AMD) 715*a*, each operable to provide dynamic compression, attenuating signals of amplitude greater than a threshold value and amplifying signals below said threshold. The threshold value and compression ratio of each AMD 715*a* is predetermined to the hearing loss profile of a particular user 520 of FIG. 5. Dynamic compression acts to reduce the dynamic range of signals received at the ear, and accordingly reduces the masking affect of loud sounds. In addition, as will be described below, the compression algorithm of each AMD 715*a* provides spectral contrast enhancement to compensate for simultaneous masking at nearby frequencies in the frequency domain and introduces inter-modulation distortion that mimics the distortion produced naturally by a healthy cochlea. The AMD 715*a* is operable to at least partially compensate for all of the three above mentioned effects associated with cochlear hearing loss. An equalizer bank 715*b* applies a predetermined amount of gain to the output of each AMD 715*a*. The amount of gain is predetermined to the hearing loss profile of a particular user 520 of FIG. 5, using the array hearing aid system by means of an audiometric procedure. A signal adder 720*c* adds the output signals from the equalizer bank 715*b* to reconstruct the signal so that it can be output as sound by the earphones 505 or 510 of FIG. 5.

The reconfiguration module 645 includes a non volatile memory ("NVM") 720 connected to a code processor 725, operable to download a set of commands which subsequently execute instructions that configure a reconfiguration unit 730. The reconfiguration unit 730 is operable to reprogram data, algorithms or some combination thereof within the directional microphone 705, the multiband processing unit 710, and the IACU 715 of the signal processing unit 625.

Figure 8:
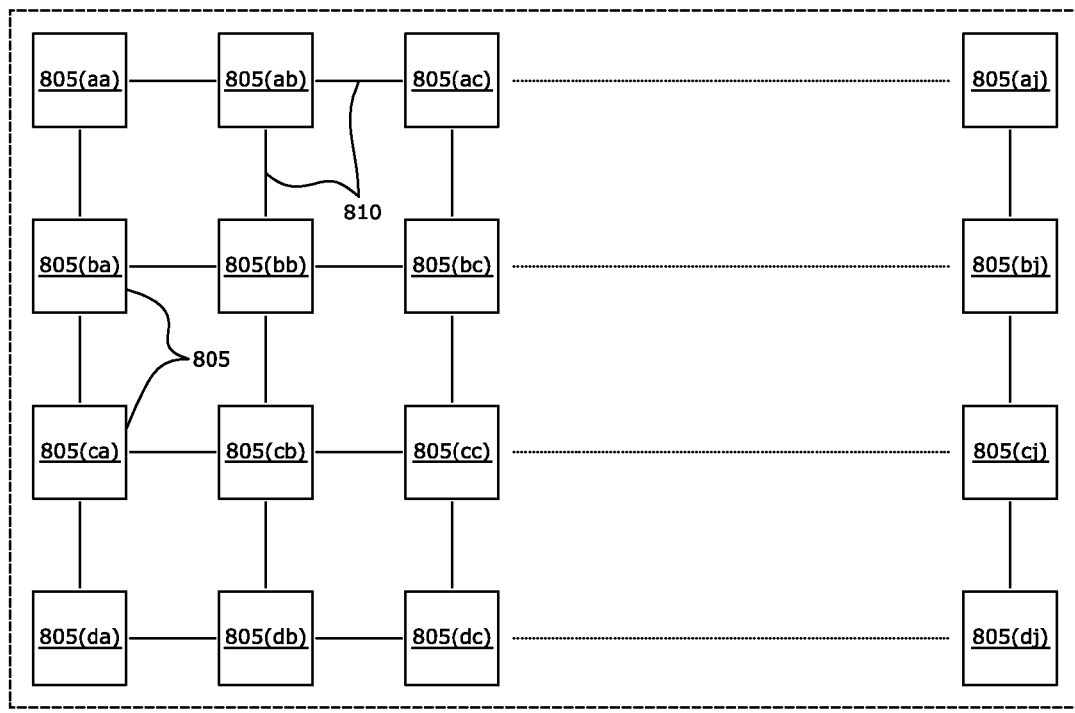
FIG. 8 is a block diagram of the array hearing aid according to an embodiment of the invention.
Figure 8:
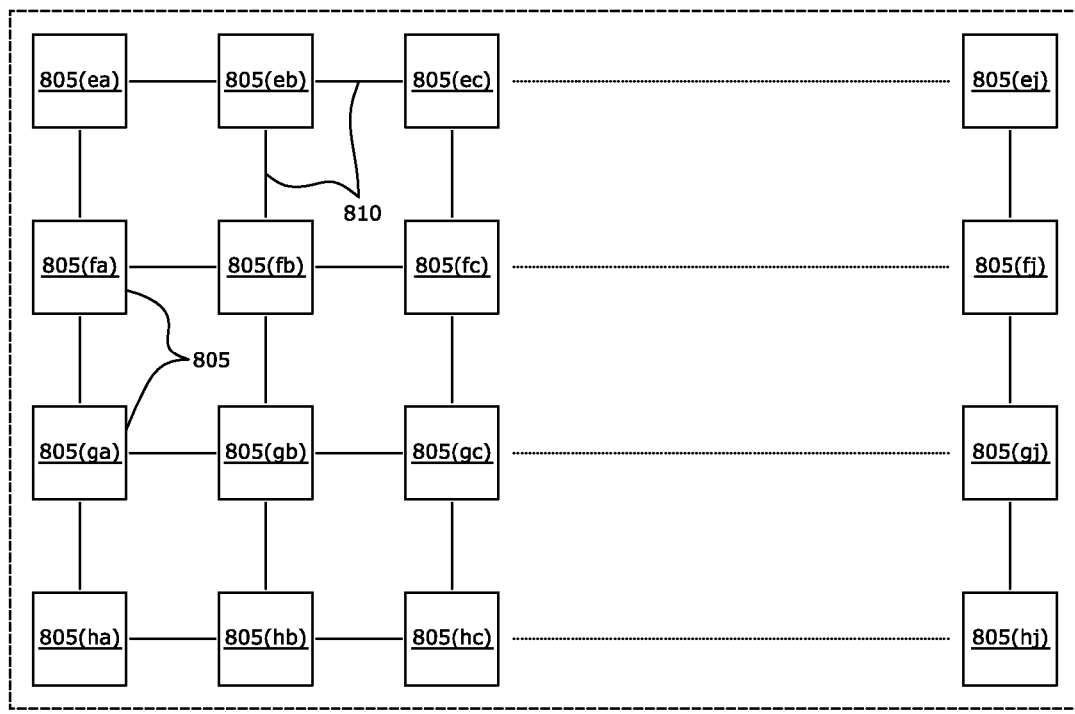

FIG. 8 illustrates a system level implementation of the array hearing aid system by using an array of asynchronous processing devices 805(*aa*) to 805(*hj*). Each processing device, 805(*aa*) to 805(*hj*), is connected to a plurality of neighboring processing devices orthogonally. Each processing device communicates with neighboring processing devices over a single drop bus 810 that includes data lines, read lines, read control lines, and write control lines. There is no common bus. For example, processing device 805(*bb*) communicates with four neighboring processors 805(*ba*), 805(*ab*), 805(*bc*), and 805(*cb*) using buses 810. In an alternate embodiment, a diagonal intercommunication bus (not shown) could be used to communicate diagonally between neighboring processors instead of or in addition to the present orthogonal buses 810. For example, processing device 805 (*bb*) would communicate with neighboring processors 805 (*aa*), 805(*ac*), 805(*ca*), and 405(*cc*). According to the invention, the functional tasks performed by the array hearing aid system such as the directional microphone 705, multiband processing 710, the IACU 715, the code processor 725, and the reconfiguration unit 730 are distributed on the array of processing devices 805(aa) to 805(hj).

Figure 9A:
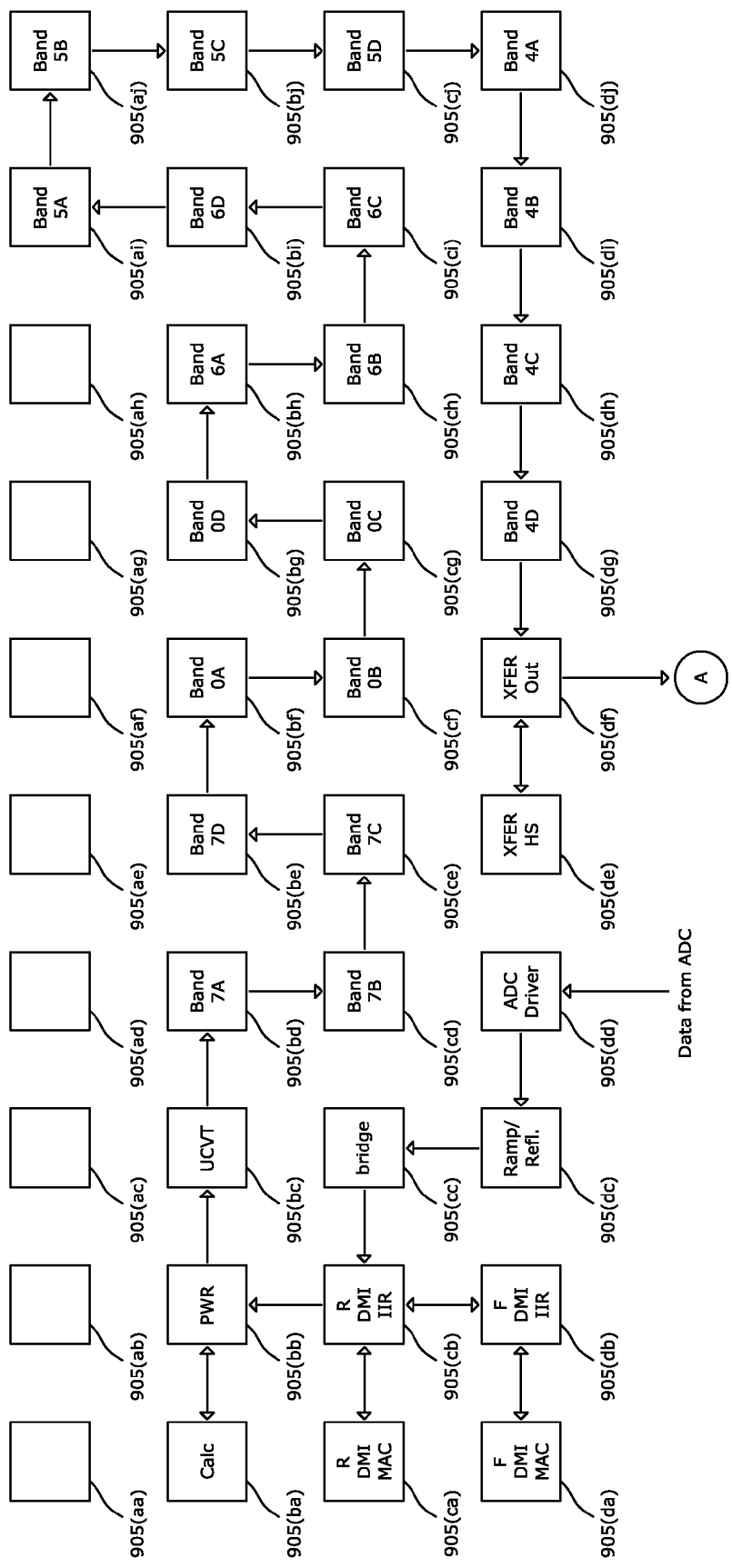
FIGS. 9a and 9b illustrate the array of processors used to perform input filtering, multiple frequency band processing and spectral and temporal masking of the array hearing aid system.
Figure 9B:
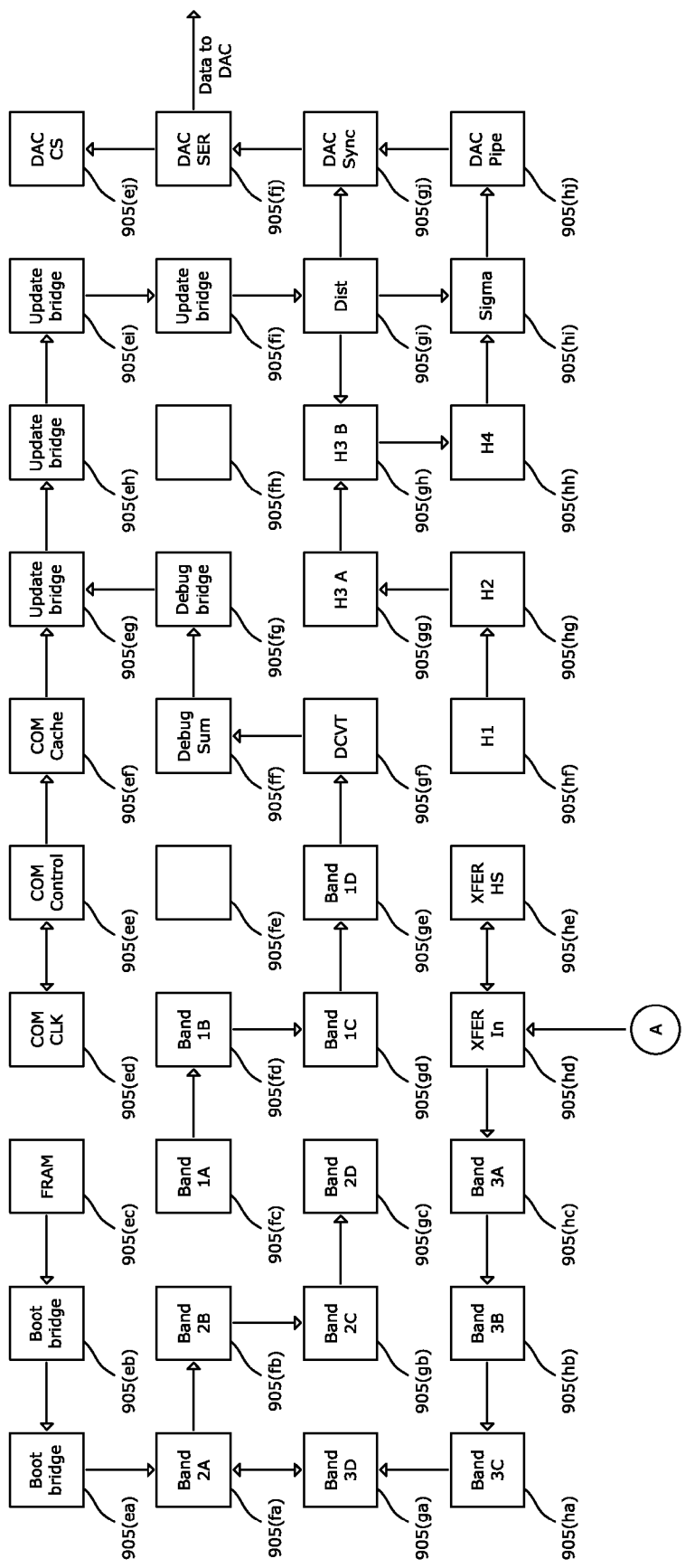

FIGS. 9a and 9b illustrate the array of processors used to perform the directional microphone, multiband processing, IACU, code processors, and reconfiguration unit. FIG. 9a represents an array of processors on a single die, and FIG. 9b represents an array of processors on a second die as a preferred embodiment for implementing an array hearing aid device.

In an alternate embodiment, a single array of processors on one die could be used to implement an array hearing aid device.

In a second alternate embodiment, an array of dies containing an array of processors could be used to implement an array hearing aid device.

FIG. 9a illustrates the array of processors used to perform directional microphone processing. The ADC driver in device 905(dc) receives data from ADC 620 of FIG. 6, and provides this data to device 905(ca) operable as a rear directional microphone ("RDMI") multiply accumulate ("MAC"), and device 905(cb) operable as a RDMI infinite impulse response ("IIR") filter, and device 905(da) operable as a front directional microphone ("FDMI") MAC, and device 905(db) operable as a FDMI IIR filter. Next, device 905(ba) and device 905(bb) are operable together as an average power calculator by creating a weighted portion of the absolute values of the output from the front channel and the shifted rear channel. Last, as part of the directional microphone processing, the device 905(bc) is operable to up-convert ("UCVT") the combined front and shifted audio channel prior to the multiband processing.

FIG. 9a also illustrates the array of processors used to perform part of the multiband processing unit. The multiband processing unit 710 of FIG. 7 is implemented using a series of processing devices operable as digital filters. Devices 905(bd), 905(be), 905(cd), and 905(ce) are operable to perform band separation for the highest band frequency. Each frequency band is processed by means of four processing device nodes which are operable to execute an nth order filter to provide only the data in the operating frequency for that band. In a preferred embodiment a total of eight frequency bands are processed on the array of processors occupying a total of 32 processing devices, however, only five of the eight bands are shown in FIG. 9a.

The last three of the eight frequency bands are processed on the second die in FIG. 9b. Completing the multiband processing is processing device 905(gf) operable to down convert (DCVT) each of the audio frequency bands prior to the IACU processing.

FIG. 9b also illustrates the array of processors to perform the data compensation as part of the IACU processing. The output from the multiband processing unit at the down converter 905(gf) is compressed to provide spectral and temporal unmasking. The real and real/imaginary & magnitude/phase components of the signals in the band are first generated using a simple Hilbert Transform. The Hilbert transform is performed by five processing devices 905(hf), 905(hg), 905(gg), 905(gh), and 905(hh). Processing device 905(gi) and device 905(hi) make up the remainder of the IACU unit, in which the compression ratio parameter, gain, and master gain are applied and the audio signal reconstructed. Last, in FIG. 9b the output from the IACU unit is prepared by devices 905(ej), 905(fj), 905(gj) and 905(hj) for the DAC driver unit for output to the digital to analog converter 630 of FIG. 6.

In a preferred embodiment, the digital to analog converter 620 and the analog to digital converter 630 are enabled by the rising edge of the same clock signal. Hence, the ADC 620 and DAC 630 are controlled in a synchronous system and embodied by synchronous circuits. On the other hand, the signal processing unit 625 is not enabled by a clock and is controlled by an asynchronous system and embodied by asynchronous circuits on the array of processors 905. Recall from FIG. 6 that the signal processing unit 625 has inputs from ADC 620 and outputs to the DAC 630. Thus, the input to the signal processing unit 625 and output from the signal processing unit 625 must be synchronized to the ADC 620 and DAC 630 in a single sample clock.

The amount of time required for the array of processors 905 to perform the signal processing function exceeds that of one sample clock signal. In total, the time required for the signal processing function is three times greater than one sample clock signal. A blind node is inserted into the array of processors 905 for each factor in which the actual time required to perform the signal processing on the array of processors exceeds the sample clock signal. Hence, three blind nodes are inserted into the array of processors 905 in the form of processing devices.

The first blind node is processing device 905(he). The function of device 905(he) is twofold. First, it is responsible for managing the inputs to the second die used as a preferred embodiment for the signal processing unit 625. The inputs are the digital audio samples which have yet to be processed by bands 1, 2, and 3 as well as the output from the band processing in bands 0, 4, 5, 6, and 7.

A second blind node is processing device 905(gf). The function of device 905(gf) is twofold. First, it is responsible for down-converting the output from the multiband processing 710 in preparation for use in the IACU unit 715. The second responsibility is to echo control block reads.

A third blind node is processing device 905(hj). The function of device 905(hj) is twofold. First, it is responsible for preparing the output from the IACU unit 715 to be used in the DAC driver unit on the array of processing devices 905. The second responsibility is to echo control block reads.

INDUSTRIAL APPLICABILITY

The inventive computer logic arrays processors 105 busses 110, groupings 115, 120 and 125, and signal processing methods are intended to be widely used in a great variety of communication applications, including hearing aid systems. It is expected that they will be particularly useful in wireless applications where significant computing power and speed is required.

As discussed previously herein, the applicability of the present invention is such that the inputting information and instructions are greatly enhanced, both in speed and versatility. Also, communications between a computer array and other devices are enhanced according to the described method and means. Since the inventive computer logic arrays processors 105 busses 110, groupings 115, 120 and 125, and signal processing methods may be readily produced and integrated with existing tasks, input/output devices and the like, and since the advantages as described herein are provided, it is expected that they will be readily accepted in the industry. For these and other reasons, it is expected that the utility and industrial applicability of the invention will be both significant in scope and long-lasting in duration.

The invention claimed is:

1. A processor array comprising:
   a plurality of processors; and, a plurality of single drop busses connecting individual processors to other processors wherein each processor is connected to at least two other processors; and a first group of processors connected together for performing a first task; and a second group of processors connected together for performing a second task;

at least one processor connected to said first group of processors and said second group of processors for facilitating communications between said first group of processors and said second group of processors without participating in said first task and said second task and wherein said at least one processor functions to synchronize an asynchronous processing array of processing devices with synchronous devices.

2. A processor array as in claim 1, wherein said at least one processor functions to echo the control requests of a downstream processing device.

3. A processor array as in claim 2, wherein said at least one processor further functions for a second task after the control request has been satisfied from a downstream processing device but before the next control request has been made from the downstream processing device.

4. A processor array as in claim 1, wherein said at least one processor functions to dynamically reconfigure said array.

* * * * *